US010775885B2

(12) United States Patent
Leland et al.

(10) Patent No.: US 10,775,885 B2
(45) Date of Patent: Sep. 15, 2020

(54) INFORMATION HANDLING SYSTEM AND METHOD TO IMPROVE THE ACCURACY OF EYE TRACKING DATA GENERATED BY AN EYE TRACKING SYSTEM

(71) Applicant: DELL PRODUCTS L.P., Round Rock, TX (US)

(72) Inventors: Jake Mitchell Leland, Arlington, TX (US); Spencer Grant Bull, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 58 days.

(21) Appl. No.: 16/277,433

(22) Filed: Feb. 15, 2019

(65) Prior Publication Data

US 2020/0264699 A1 Aug. 20, 2020

(51) Int. Cl.

| | |
|---|---|
| ***G06F 1/16*** | (2006.01) |
| ***G06F 3/01*** | (2006.01) |
| ***G01C 1/00*** | (2006.01) |

(52) U.S. Cl.

CPC ............... *G06F 3/013* (2013.01); *G01C 1/00* (2013.01); *G06F 1/1618* (2013.01); *G06F 1/1681* (2013.01)

(58) Field of Classification Search

CPC ....... G06F 3/013; G06F 1/1681; G06F 1/1618
See application file for complete search history.

(56) References Cited

U.S. PATENT DOCUMENTS

| | | | | |
|---|---|---|---|---|
| 7,572,008 | B2 | 8/2009 | Elvesjo et al. | |
| 2014/0092139 | A1* | 4/2014 | Sullivan | G06K 9/0061 345/649 |
| 2017/0371420 | A1* | 12/2017 | Skogo | G06F 1/1684 |
| 2018/0129262 | A1* | 5/2018 | Veiga | G06F 3/012 |

OTHER PUBLICATIONS

Tobii Pro, "How do Tobii Eye Trackers Work?", 2017, 7 pages.

* cited by examiner

*Primary Examiner* — Hugo Molina
(74) *Attorney, Agent, or Firm* — Egan Peterman Enders Huston

(57) ABSTRACT

The present disclosure provides embodiments of systems and methods that may be used by an information handling system (IHS) to improve the accuracy of eye tracking data generated by an eye tracking system of the IHS when a user's gaze is not directed to a gaze interaction plane of the eye tracking system. In one embodiment, the method may include receiving first data corresponding to a hinge angle (θ) measured between a first surface and a second surface of the IHS, receiving second data corresponding to a user's gaze on the first surface or the second surface, and using the first data and the second data to provide accurate eye tracking data when the user's gaze is directed to the second surface. When the user's gaze is directed to the first surface, the method may use the second data, but not the first data, to provide accurate eye tracking data.

19 Claims, 6 Drawing Sheets

100

110 — Receive first data from a hinge angle sensor corresponding to a hinge angle measured between a first surface and a second surface of an information handling system (IHS)

120 — Receive second data from an eye tracking system of the IHS corresponding to a user's gaze on the first surface or the second surface 130 — Use the first data and the second data to provide accurate eye tracking data regardless of whether the user's gaze is directed to the first surface or the second surface of the IHS 140 — Detect change in hinge angle? YES / NO End

INFORMATION HANDLING SYSTEM AND METHOD TO IMPROVE THE ACCURACY OF EYE TRACKING DATA GENERATED BY AN EYE TRACKING SYSTEM

FIELD OF THE INVENTION

This invention relates generally to information handling systems having eye tracking systems, and more particularly, to information handling systems and methods to improve the accuracy of eye tracking data generated by an eye tracking system.

BACKGROUND OF THE INVENTION

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems, such as laptop computers and 2-in-1 computers, may generally comprise a lid that is rotationally coupled to a base of the IHS. In a traditional clamshell configuration, the lid may be rotationally coupled to the base, so that the lid articulates between a closed position (approximately 0°) to a variety of open positions (e.g., up to approximately 360°) to expose a display screen of the IHS to the user. When the IHS is not in use, the lid may be rotated back to the closed position to enhance portability of the IHS. In general, one or more hinges may be coupled between the lid and the base on a rear surface of the IHS to provide the articulation desired in the clamshell configuration.

In some cases, an information handling system may include one or more display screens for displaying information to the user when the lid is rotated to an open position, and one or more sensors for determining an orientation of the lid with respect to the base (or vice versa). For example, some IHSs may include a sensor on the lid (or on the base) to determine an angle (otherwise referred to as the "hinge angle") between the lid and the base. In such systems, the hinge angle (θ) provided by the sensor may be used to determine whether, e.g., the lid is in a closed/open position, or the system is being used in laptop or tablet mode. In some cases, the hinge angle provided by the sensor may be used by a processing device of the IHS to perform an action for the IHS, such as changing a display orientation of a display screen (e.g., changing between portrait and landscape orientations), changing operating system user states and application modes, and changing backlight segmentation illumination.

Some information handling systems include an eye tracking system to detect the position and/or gaze direction of the user's eyes. In one example, an eye tracking system may include at least one light source positioned to illuminate the user's eyes, at least one photosensor (or camera) positioned to detect light reflected off the user's eyes, and a control unit or other processing device, which is configured to generate eye tracking data based on the light reflected off the user's eyes and detected by the photosensor(s) of the eye tracking system.

As shown in FIG. 1, the generated eye tracking data may include, for example, a gaze point (GP), gaze direction (α), one or more gaze vectors ($G_1$ and/or $G_2$), and/or an inter-pupillary distance (IPD) measurement. The gaze point (GP) is the location of the user's gaze (i.e., the point or region where the user is looking) on a gaze interaction plane (P). The gaze direction (α) is the direction or angle of the user's gaze towards the gaze interaction plane. A gaze vector ($G_1$ or $G_2$) includes the gaze direction (α) and the distance (i.e., the magnitude of the gaze vector) between the gaze point (GP) on the gaze interaction plane (P) and one of the user's eyes located on a pupil plane (E). The inter-pupillary distance (IPD) is the distance between the user's pupils. Some eye tracking systems may be configured to provide all of the eye tracking data mentioned above, while other eye tracking systems may provide only a subset of this data.

To generate eye tracking data, the control unit or other processing device of the eye tracking system may detect "glints" or reflections of light, which are reflected off the user's eyes and detected by the photosensor(s) or camera(s) of the eye tracking system. The detection of "glints" and the calculation of eye tracking data may be achieved using a variety of well-known techniques (including 2D and/or 3D techniques). Once calculated by the eye tracking system, the eye tracking data can be used by a processing device of an IHS to perform an action for the IHS, such as performing operation system window management.

Some information handling systems include a single eye tracking system for tracking the location of the user's gaze on a plurality of display screens. FIG. 2 illustrates an information handling system (IHS) in which a first display screen ("Display 1") is rotationally coupled to a second display screen ("Display 2") via a hinge, which enables the display screens to be positioned at a variety of hinge angles (θ). In the dual-screen system shown in FIG. 2, a single eye tracking system ("s") is mounted onto the first display screen near a bottom peripheral portion of the display screen at an origin point (0, 0, 0). Alternatively, the eye tracking system could be mounted onto the first display screen near a top peripheral portion of the display screen, or could be mounted onto a top or bottom peripheral portion of the second display screen.

When mounted onto the first display screen as shown in FIG. 2, the single eye tracking system may generate relatively accurate eye tracking data when the user's gaze is directed toward the first display screen, since the first display screen is parallel to (or lies within) the gaze interaction plane (P) of the eye tracking system. In some cases, for example, the eye tracking system may provide a relatively accurate gaze point, i (x, y, z), and gaze vector (G) when the user gazes upon the first display screen ("Display 1"). In some cases, a relatively accurate location of the user's eye, e (x, y, z), may also be provided by the eye tracking system as eye tracking data, or may be calculated from the eye tracking data (e.g., gaze point and gaze vector) provided by the eye tracking system.

However, a problem may arise in the dual-screen system shown in FIG. 2 when the user's gaze is directed toward the second display screen ("Display 2"). When the user gazes upon the second display screen, the eye tracking system generates eye tracking data (e.g., gaze point, gaze vector, and/or eye location, etc.) relative to the gaze interaction plane (P) of the eye tracking system. If the second display screen is rotated away from the gaze interaction plane (e.g., if any hinge angle, θ, other than 180° exists between Display 1 and Display 2), the eye tracking data generated by the eye tracking system will not be accurate when the user gazes upon the second display screen. A need, therefore, remains for a system and method that improves the accuracy of the eye tracking data generated by an eye tracking system when the user's gaze is not directed to the gaze interaction plane (P) of the eye tracking system.

SUMMARY OF THE INVENTION

The following description of various embodiments of information handling systems and methods to improve the accuracy of the eye tracking data generated by an eye tracking system when the user's gaze is not directed to the gaze interaction plane of the eye tracking system is not to be construed in any way as limiting the subject matter of the appended claims.

According to one embodiment, a method is provided herein to improve the accuracy of eye tracking data, which is generated by an eye tracking system included within an information handling system (IHS) when the user's gaze is not directed to a gaze interaction plane of the eye tracking system. The disclosed method may generally be performed by a processing device of an IHS, and thus, is a computer implemented method performed by hardware, software and/or firmware components of an IHS. In some embodiments, the eye tracking system may be coupled to a first surface of the IHS, which is rotationally coupled to a second surface of the IHS via a hinge that enables the first and second surfaces to rotate about an axis over a range of hinge angles. Since the eye tracking system is coupled to the first surface, the first surface of the IHS is parallel to a gaze interaction plane (P) of the eye tracking system, and the second surface of the IHS is rotationally displaced from first surface and the gaze interaction plane (P) by the hinge angle (θ).

In general, the method disclosed herein may include receiving first data corresponding to a hinge angle (θ) measured between the first surface and the second surface of the IHS, receiving second data corresponding to a user's gaze on the first surface or the second surface of the IHS, and using the first data and the second data to provide accurate eye tracking data when the user's gaze is directed to the second surface of the IHS. As such, the method disclosed herein may use the hinge angle (θ) measured between the first and second surfaces to improve the accuracy of the eye tracking data (i.e., the second data) generated by the eye tracking system when the user's gaze is directed to the second surface (or another IHS surface that does not correspond to the gaze interaction plane of the eye tracking system). On the other hand, the method disclosed herein may use the second data, but not the first data, to provide accurate eye tracking data when the user's gaze is directed to the first surface of the IHS. The second data may be used alone to provide an accurate location of the user's gaze on the first surface of the IHS since the first surface is parallel to the gaze interaction plane of the eye tracking system.

It is noted that the method disclosed herein is not strictly limited to an IHS having a first surface rotationally coupled to a second surface, and may include additional surfaces that may be rotationally displaced from the first surface and from the gaze interaction plane (P) of the eye tracking system by a hinge angle (θ). In some embodiments, for example, a third surface of the IHS may be coupled to the first surface via another hinge, which enables the first and third surfaces to rotate about an axis over a range of hinge angles. In such embodiments, the method disclosed herein may use the hinge angle (θ) measured between the first and third surfaces to improve the accuracy of the eye tracking data (i.e., the second data) generated by the eye tracking system when the user's gaze is directed to the third surface.

In some embodiments, the method disclosed herein may further include detecting a change in the hinge angle, such that a new hinge angle is measured between the first surface and the second surface. If a change in the hinge angle is detected, the method may repeat the steps of receiving first data corresponding to the new hinge angle, receiving second data corresponding to a user's gaze on the first surface or the second surface, using the first data and the second data to provide accurate eye tracking data when the user's gaze is directed to the second surface, and using the second data, but not the first data, to provide accurate eye tracking data when the user's gaze is directed to the first surface.

As noted above, the first data and the second data may be used by the method disclosed herein to provide accurate eye tracking data when the user's gaze is directed to the second surface of the IHS. In some embodiments, the method may use the first data to transform the gaze interaction plane (P) of eye tracking system into a projected gaze interaction plane (P'), which is displaced from the gaze interaction plane (P) by the hinge angle (θ). In one example embodiment, the step of using the first data to transform the gaze interaction plane (P) may include rotating a normal vector (n) of the gaze interaction plane (P) in a clockwise direction about the axis by an angle complementary to the hinge angle (e.g., 180°−θ) to define a normal vector (n') to the projected gaze interaction plane (P'), and using the normal vector (n') to define the projected gaze interaction plane (P').

Once the projected gaze interaction plane is determined, the second data may be projected onto the projected gaze interaction plane (P') to determine an accurate location of the user's gaze on the second surface of the IHS. In some embodiments, the second data may include a gaze point on the gaze interaction plane of the eye tracking system and a 3-D location of the user's eye. In one example embodiment, the step of projecting the second data onto the projected gaze interaction plane (P') may include defining a direction vector between the gaze point on the gaze interaction plane and the 3-D location of the user's eye, and using the direction vector to locate a projected gaze point on the projected gaze interaction plane (P').

According to another embodiment, an information handling system (IHS) is provided herein including a first display device, a second display device, a hinge angle sensor, an eye tracking system, a computer readable storage memory and a processing device. The second display device is rotationally coupled to the first display screen via a hinge that enables the first and second display devices to rotate about an axis over a range of hinge angles. The hinge angle sensor is configured to generate data corresponding to a hinge angle (θ) measured between the first and second display devices. The eye tracking system is coupled to (e.g., mounted onto, or embedded within) the first display device in the disclosed embodiment, and configured to generate eye tracking data corresponding to a user's gaze on the first and second display devices. The processing device is coupled to receive the data generated by the hinge angle sensor and the eye tracking data generated by the eye tracking system, and configured to execute program instructions stored within the computer readable storage memory.

In some embodiments, the eye tracking system included within the IHS may be mounted onto, or embedded within, the first display device of the IHS. In such embodiments, a display screen surface of the first display device may be parallel to a gaze interaction plane (P) of the eye tracking system, while a display screen surface of the second display device is displaced from the gaze interaction plane (P) by the hinge angle (θ).

When the user's gaze is directed to the first display device, the processing device uses the eye tracking data received from the eye tracking system to provide an accurate location of the user's gaze. When the user's gaze is directed to the second display device, however, the processing device executes the stored program instructions to improve the accuracy of the eye tracking data received from the eye tracking system using the data (hinge angle, θ) received from the hinge angle sensor.

When the user's gaze is directed to the second display device, the processing device may execute a first set of the stored program instructions to transform the gaze interaction plane (P) of eye tracking system into a projected gaze interaction plane (P'), which is rotationally displaced from the gaze interaction plane (P) by the hinge angle (θ). In one example embodiment, the processing device may execute the first set of the stored program instructions to rotate a normal vector (n) of the gaze interaction plane (P) in a clockwise direction about the axis by an angle complementary to the hinge angle (e.g., 180°−θ) to define a normal vector (n') to the projected gaze interaction plane (P'), and use the normal vector (n') to define the projected gaze interaction plane (P').

Once the projected gaze interaction plane (P') is determined, the processing device may execute a second set of the stored program instructions to project the eye tracking data generated by the eye tracking system onto the projected gaze interaction plane (P') to determine an accurate location of the user's gaze on the second display device. In some embodiments, the eye tracking data generated by the eye tracking system may include a gaze point located on the gaze interaction plane (P) and a 3-D location of the user's eye. In one example embodiment, the processing device may execute the second set of the stored program instructions to define a direction vector between the gaze point on the gaze interaction plane and the 3-D location of the user's eye, and use the direction vector to locate a projected gaze point on the projected gaze interaction plane (P') corresponding to the location of the user's gaze on the second display device.

In some embodiments, the processing device may be configured to execute a third set of the stored program instructions to detect a change in the hinge angle. Upon detecting a change in the hinge angle, the processing device may receive data from the hinge angle sensor corresponding to a new hinge angle measured between the first and second display devices, and may re-execute the first and second sets of program instructions to determine an accurate location of the user's gaze on the second display device using the new hinge angle.

BRIEF DESCRIPTION OF THE DRAWINGS

Other advantages of the invention will become apparent upon reading the following detailed description and upon reference to the accompanying drawings in which.

Figure 1:
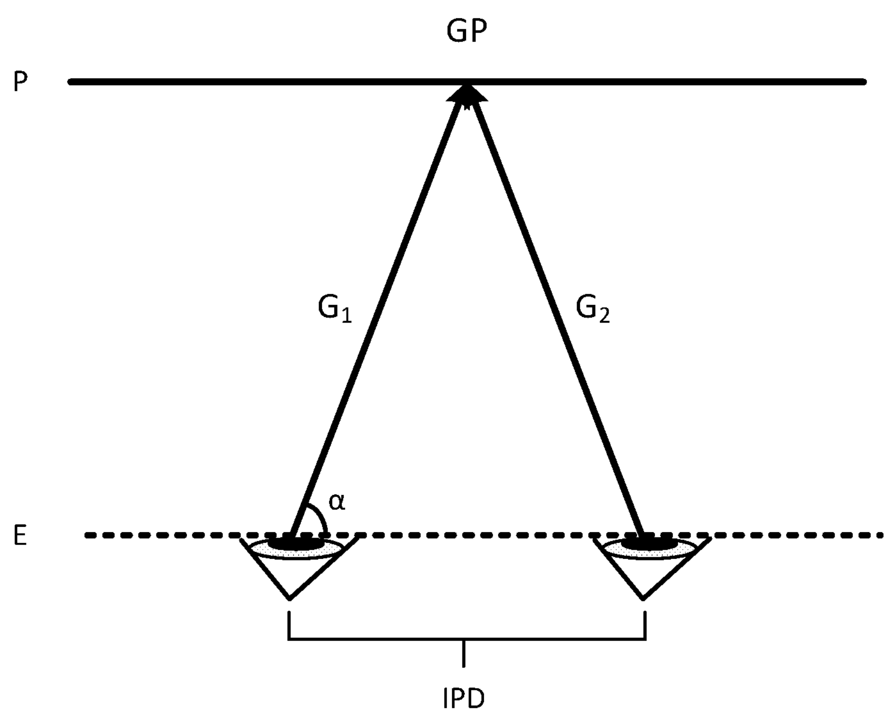
FIG. 1 (Prior Art) is a diagram illustrating examples of eye tracking data that may be generated by an eye tracking system.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Generally speaking, the present disclosure provides various embodiments of information handling systems (IHSs) and methods that may be used to improve the accuracy of eye tracking data generated by an eye tracking system. In particular, the disclosed systems and methods may be used to improve the accuracy of eye tracking data, which is generated by an eye tracking system when the user's gaze is not directed to the gaze interaction plane of the eye tracking system. In some embodiments, the systems and methods disclosed herein may be used to generate accurate eye tracking data (e.g., gaze point, gaze vector(s), and/or eye location, etc.) when an IHS includes only one (1) eye tracking system for tracking the location of a user's gaze on a plurality (N) of display screens.

It is noted, however, that the present disclosure is not strictly limited to an IHS that includes only one eye tracking system, or to gaze tracking on only display screen surfaces. In one alternative embodiment, the systems and methods disclosed herein may be used to improve the accuracy of eye tracking data provided by multiple (e.g., M) eye tracking systems, which are included within an IHS for tracking the location of a user's gaze on a plurality (N) of display screens. Such embodiments may be particularly beneficial when the number of eye tracking systems is less than the number of display screens (i.e., when M<N). In another alternative embodiment, the systems and methods disclosed herein may be used to determine an accurate location of a user's gaze on a surface of the IHS (such as, e.g., a keyboard, touch pad, etc.), which is not a display screen.

Figure 3:
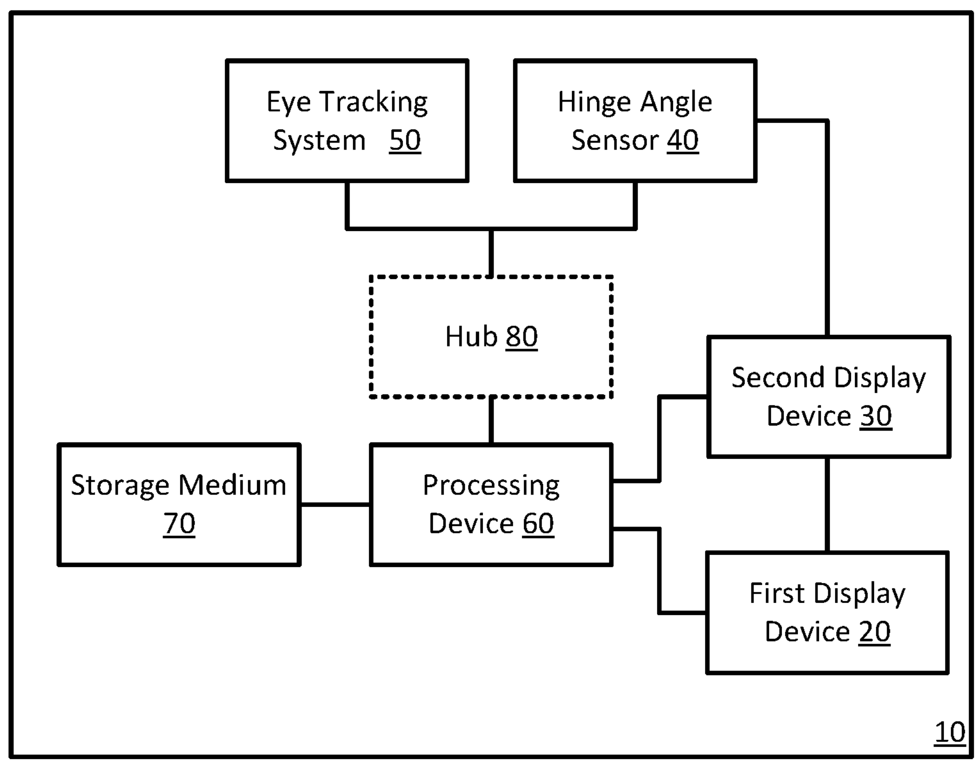
FIG. 3 is a block diagram illustrating one embodiment of an information handling system (IHS) including an eye tracking system, which is configured to track a user's gaze on a plurality of display screens, and a processing device configured to improve the accuracy of the eye tracking data generated by the eye tracking system.

FIG. 3 is a block diagram illustrating one embodiment of an information handling system (IHS) 10 (e.g., a desktop computer, laptop computer, tablet computer, 2-in-1 computer, cell phone, etc.) as it may be configured according to one example embodiment of the present disclosure. In the example embodiment shown in FIG. 3, IHS 10 includes a first display device 20, a second display device 30, a hinge angle sensor 40, an eye tracking system 50, a processing device 60, a computer readable storage medium or memory 70 and (optionally) a hub 80.

It is expressly noted that the IHS configuration shown in FIG. 3 is exemplary only, and that the disclosed methods may be implemented on any type and/or configuration of information handling system having at least one eye tracking system (50) for tracking the location of a user's gaze onto one or more surfaces of the information handling system. As noted above, such surfaces may include display screen surfaces of one or more display device (such as the first and second display devices shown in FIG. 3) and/or another surface of the IHS (such as, e.g., a keyboard, touch pad, etc.). It will be further understood that while certain components of the information handling system are shown in FIG. 3 for illustrating embodiments of the present disclosure, the information handling system disclosed herein is not restricted to including only those components shown in FIG. 3 and described below.

The first display device 20 and the second display device 30 shown in FIG. 3 may be implemented in a variety of different ways. In some embodiments, the first and second display devices may include display screens, which are embedded within a chassis of the IHS 10. In other embodiments, the first and second display devices may be implemented as external display screens or monitors, which are coupled to the IHS 10. In either embodiment, first display device 20 may be rotationally coupled to second display device 30 via one or more hinges (not shown).

Although not explicitly illustrated in the drawings, IHS 10 may include additional display device(s), in other embodiments of the present disclosure. In some embodiments, for example, IHS 10 may include a third display device, which is rotationally coupled to first display device 20 via additional hinge(s), such that the first, second and third display devices form a tri-fold display device. In other embodiments, additional display devices (e.g., a fourth and/or a fifth display device) may be rotationally coupled to first display device 20 via additional hinge(s). In such embodiments, a single eye tracking system 50 may be used to track the location of a user's gaze on display screen surfaces of multiple display devices, as long as each device is adjacent to the first display device 20 (i.e., the display device in which the eye tracking system is located).

Figure 5:
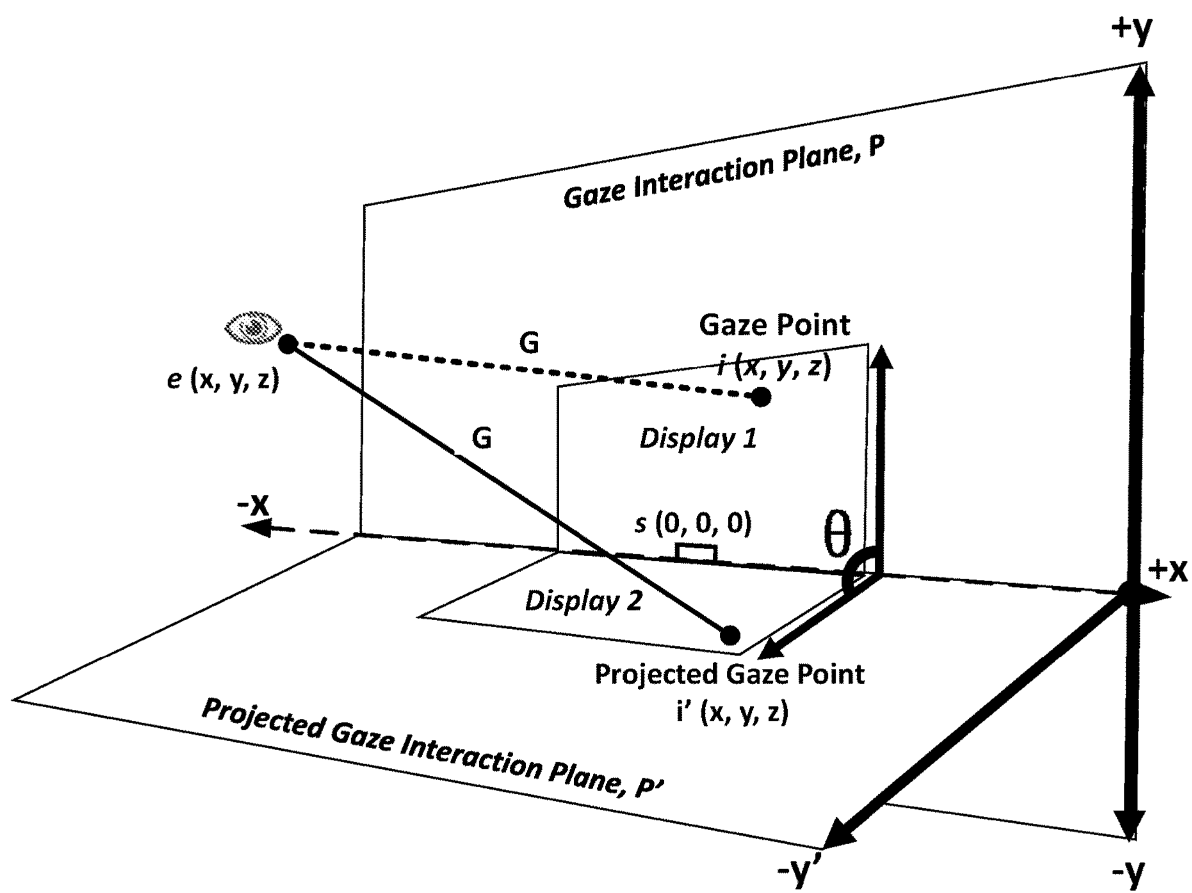
FIG. 5 is a graphical depiction illustrating one embodiment of an information handling system in which a single eye tracking system ("s") is included for tracking the location of a user's gaze on a plurality of display screens (e.g., "Display 1" and "Display 2") and a processing device (not shown) is included for projecting the eye tracking data generated by the eye tracking system onto a projected gaze interaction plane (P') when the user's gaze is directed to an IHS surface (e.g., "Display 2") that does not lie within a gaze interaction plane (P) of the eye tracking system.

The hinge(s) may be implemented in any manner that enables display surfaces of the display devices to rotate toward/away from one another about an axis. As shown in FIG. 5, for example, the hinge(s) may enable the first and second display devices to rotate about an axis (e.g., an x-axis) over a range of hinge angles (θ). In one embodiment, the range of hinge angles (θ) provided by the hinge(s) may extend between approximately 0° and approximately 360°. In other embodiments, the hinge(s) may be configured to provide only a subset of this range.

Hinge angle sensor 40 is configured to determine an angle (otherwise referred to as the "hinge angle") between two surfaces of the information handling system. In the illustrated embodiment, hinge angle sensor 40 is coupled and configured to generate data corresponding to a hinge angle (θ) between a display screen surface of the first display device 20 and a display screen surface of the second display device 30. In other embodiments (not shown), hinge angle sensor 40 may be coupled and configured to generate data corresponding to a hinge angle (θ) between a display screen surface of one of the display devices (such as, e.g., first display device 20) and another component (e.g., a keyboard, touch pad, or base) of the IHS. In other embodiments (not shown), additional hinge angle sensor(s) 40 may be included within the IHS for determining hinge angle(s) between additional IHS surfaces (such as first display device 20 and a third, fourth or fifth display device). The hinge angle sensor(s) 40 can be implemented using any sensor technology that is suitable for detecting angular position including, but not limited to, a Hall effect sensor, a gyroscopic sensor, a 6-degree-of-freedom sensor, and 9-degree-of-freedom sensor.

Eye tracking system 50 is configured to generate eye tracking data in response to a user's gaze directed onto one or more surfaces of the IHS. In one embodiment, eye tracking system 50 may be mounted onto (or embedded within) one of the display devices (e.g., first display device 20 or second display device 30) of the information handling system. As shown in FIG. 5, for example, eye tracking system 50 (denoted with an 's' in FIG. 5) may be mounted onto the first display device 20 ("Display 1") near a bottom peripheral portion of the display screen at an origin point (0, 0, 0). Alternatively, eye tracking system 50 could be mounted onto the first display device 20 near a top or side peripheral portion of the display screen, or could be mounted onto a top, bottom or side peripheral portion of the second display device 30 ("Display 2").

In the embodiment shown in FIG. 5, eye tracking system 50 is included within IHS 10 to track the location of a user's gaze on display screen surfaces of the first display device 20 and the second display device 30. In other embodiments, eye tracking system 50 may be used to track the location of a user's gaze on display screen surfaces of one or more additional display devices (e.g., a third, fourth or fifth display device), which are adjacent to the first display device 20. In yet other embodiments, additional eye tracking system(s) 50 may be included within IHS 10 to track the location of a user's gaze on display screen surfaces of display devices, which are not adjacent to the first display device 20.

Eye tracking system 50 may generally include one or more light sources positioned on the IHS for illuminating the user's eyes, and one or more photosensors or cameras positioned on the IHS for detecting light reflected off the user's eyes. In some embodiments, eye tracking system 50 may include a control unit or other processing device (e.g., an Application Specific Integrated Circuit, ASIC, or a Silicon on Chip, SoC), which is configured to execute an eye tracking algorithm to generate eye tracking data in response to a user's gaze directed toward the IHS. If included, the control unit or processing device may use any known technique and/or algorithm (e.g., a 2D or 3D eye tracking algorithm) to generate the eye tracking data. In other embodiments, eye tracking system 50 may include only light sources and cameras, which provide images of the user's eyes to processing device 60 for generating the eye tracking data.

To generate eye tracking data, eye tracking system 50 (or processing device 60) may control the light source(s) to provide illumination to the user's eyes, and may control the photosensor(s) or camera(s) to detect light reflected from the user's eyes. In one example, eye tracking system 50 may detect "glints" or reflections of light, which are reflected off the user's eyes, and may use the detected "glints" to determine eye tracking data in response to a user's gaze toward the IHS.

In some embodiments, eye tracking system 50 may provide at least one of: a gaze point, i (x, y, z), a gaze direction ($\alpha$), a gaze vector (G), and a location, e (x, y, z), of the user's eye to processing device 60 as eye tracking data. As noted above, the gaze point, i (x, y, z), is the location of the user's gaze (i.e., the point or region where the user is looking) on a gaze interaction plane (P) of the eye tracking system 50. The gaze direction ($\alpha$) is the direction or angle of the user's gaze towards the gaze interaction plane (P). The gaze vector (G) includes the gaze direction ($\alpha$) and the distance measured between the gaze point location, i (x, y, z), on the gaze interaction plane (P) and the user's eye.

In the present disclosure, the gaze interaction plane (P) is the plane in which the eye tracking system 50 is mounted onto (or embedded within) the information handling system. In one embodiment, the gaze interaction plane (P) may correspond to (or be parallel with) a display screen surface of the first display device 20 (or "Display 1") when eye tracking system 50 (denoted with an "s") is mounted onto (or embedded within) the first display device, as shown in FIG. 5. In other embodiments, the gaze interaction plane (P) may correspond to (or be parallel with) another surface of the information handling system (e.g., "Display 2", keyboard, touch pad, or base) when the eye tracking system is alternatively arranged.

Eye tracking system 50 may include substantially any 2D or 3D eye tracking system known in the art. Examples of suitable eye tracking systems 50 include, but are not limited to, those provided by Tobii AB of Stockholm, Sweden, Leap Motion, Inc. of San Fransisco, Calif., and Pupil Labs of Berlin, Germany. It is noted, however, that eye tracking system 50 is not limited to those specifically provided by Tobii AB, Leap Motion, Inc. or Pupil Labs, or to eye tracking systems capable of executing eye tracking algorithms, and may include any eye tracking system suitable for the purposes disclosed herein.

Processing device 60 is coupled to receive hinge angle ($\theta$) data from hinge angle sensor 40 and eye tracking data from eye tracking system 50, and is configured to execute program instructions stored within computer readable storage medium or memory 70 to improve the accuracy of the eye tracking data generated by the eye tracking system using the received data. Hardware components suitable for implementing processing device 60 include, but are not limited to, a central processing unit (CPU), a microprocessor, a microcontroller, an embedded controller, an ASIC, a digital signal processor (DSP) and/or another SoC.

Computer readable storage medium or memory 70 may be implemented as volatile or non-volatile computer readable memory (e.g., RAM, ROM and/or cache memory) and/or a non-volatile computer readable storage medium (e.g., NVRAM, ROM, Flash memory, hard disk drive, optical disc drive, etc.). In some embodiments, the program instructions executed by processing device 60 may be stored in a non-volatile computer readable storage medium and copied into a volatile computer readable memory prior to execution of the program instructions by the processing device.

In some embodiments, hub 80 is an optional component that may be included within IHS 10 for communicating signals and data between hinge angle sensor 40, eye tracking system 50, and processing device 60. Although not strictly limited to such, hub 80 may be a Universal Serial Bus (USB) hub, in one example.

Figure 2:
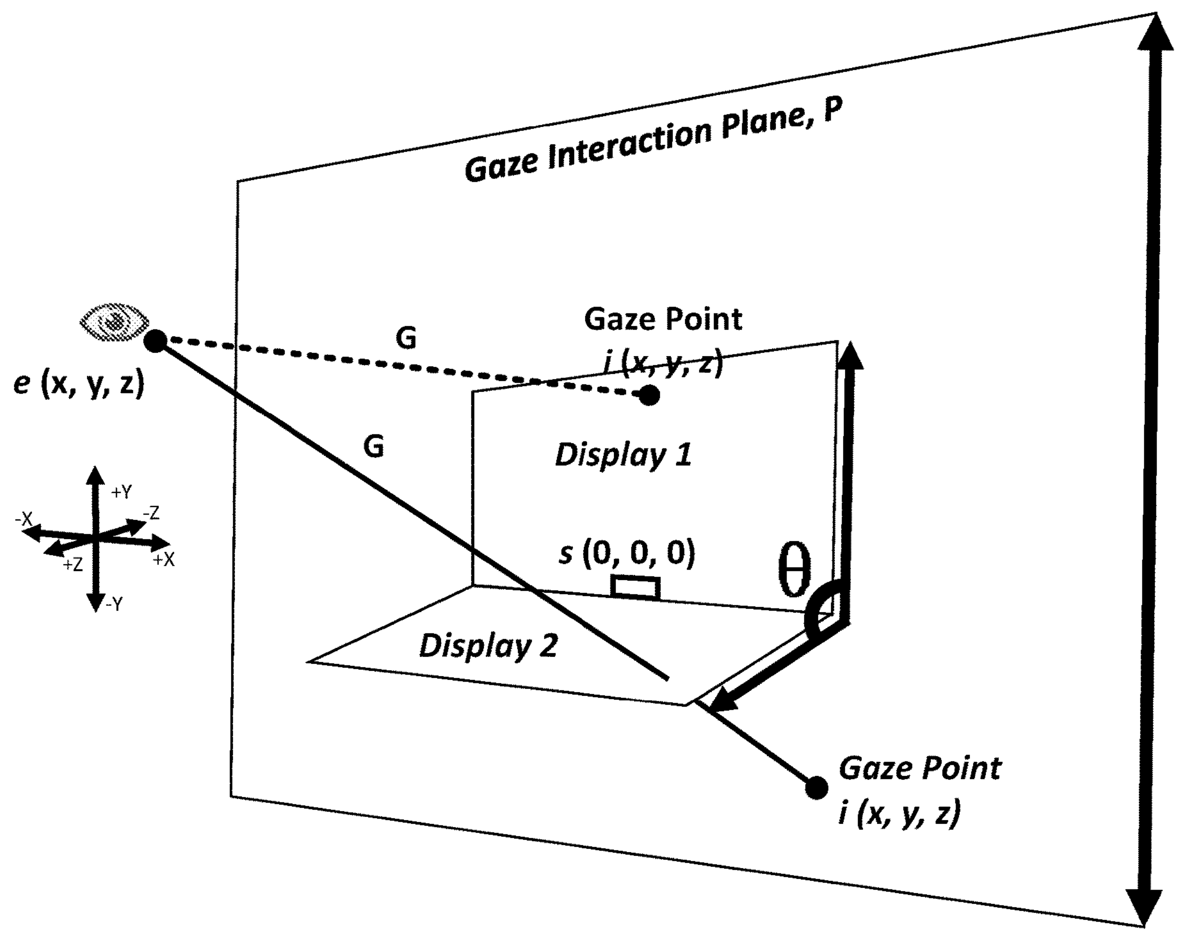
FIG. 2 (Prior Art) is a diagram illustrating eye tracking data that may be generated by an eye tracking system ("s") coupled to a first display device of an information handling system when a user's gaze is directed to the first display device ("Display 1") and a second display device ("Display 1") of the information handling system.

As noted above, a problem arises in conventional IHSs that include only one eye tracking system to track the location of the user's gaze on multiple display screens. As shown in FIG. 2, for example, a single eye tracking system ("s") coupled to a first display screen ("Display 1") of an IHS is unable to generate accurate eye tracking data when the user's gaze is directed toward a second display screen ("Display 2") of the IHS and the second display screen is rotated away from the gaze interaction plane (P) of the eye tracking system.

To overcome this problem, the present disclosure provides an improved system and method that uses the hinge angle ($\theta$) provided by a hinge angle sensor to improve the accuracy of the eye tracking data provided by an eye tracking system when the user's gaze is not directed to the gaze interaction plane (P) of the eye tracking system. This enables the improved system and method disclosed herein to provide an accurate assessment of the user's gaze location regardless of where the user is looking.

One embodiment of the improved system is illustrated in FIG. 3 as an information handling system (IHS) 10 including hinge angle sensor 40, eye tracking system 50 and processing device 60. Although the improved system is illustrated herein as including only one eye tracking system 50 for tracking the location of a user's gaze on at least two surfaces of the information handling system, alternative embodiments of the present disclosure may include multiple (M) eye tracking systems for tracking the location of a user's gaze on a plurality (N) of IHS surfaces, where $M<N$. As described briefly above and in more detail below, the system and method disclosed herein uses the hinge angle ($\theta$) provided by hinge angle sensor 40 to improve the accuracy of the eye tracking data provided by eye tracking sensor 50 when the user's gaze is not directed to the gaze interaction plane (P) of the eye tracking system. In this manner, the system and method disclosed herein may be used to provide an accurate assessment of the user's gaze location regardless of where the user is looking.

As noted above, processing device 60 is coupled to receive data from hinge angle sensor 40 and eye tracking system 50, and is configured to use the received data to improve the accuracy of the eye tracking data generated by the eye tracking system. More specifically, processing device 60 is configured to execute program instructions, which use the data received from hinge angle sensor 40 and eye tracking system 50 to improve the accuracy of the eye tracking data generated by the eye tracking system when the user's gaze is not directed to the gaze interaction plane (P) of the eye tracking system.

When the user's gaze is not directed to the gaze interaction plane (P) of the eye tracking system, for example, processing device 60 may execute a first set of program instructions, which uses the hinge angle (θ) received from hinge angle sensor 40 to transform the gaze interaction plane (P) of eye tracking system 50 into a projected gaze interaction plane (P'). Processing device 60 may execute a second set of program instructions to project the eye tracking data received from eye tracking system 50 onto the projected gaze interaction plane (P'). In doing so, the program instructions executed by processing device 60 may improve the accuracy of the eye tracking data generated by eye tracking system 50 by providing an accurate location of the user's gaze location (i.e., accurate eye tracking data) when the user's gaze is not directed to the gaze interaction plane (P) of the eye tracking system.

In some cases, display devices of the IHS may be manipulated by the user to change the hinge angle (θ) between the display devices. For example, display screen surfaces of the first and second display devices 20, 30 may be rotated further away/toward each other to increase/decrease the hinge angle (θ) measured there between by the hinge angle sensor 40. In some embodiments, processing device 60 may execute a third set of program instructions to detect a change in the hinge angle (θ) measured between two display devices. If a change in the hinge angle (θ) is detected, processing device 60 may re-execute the first and second sets of program instructions to provide accurate eye tracking data at the new hinge angle.

Figure 4:
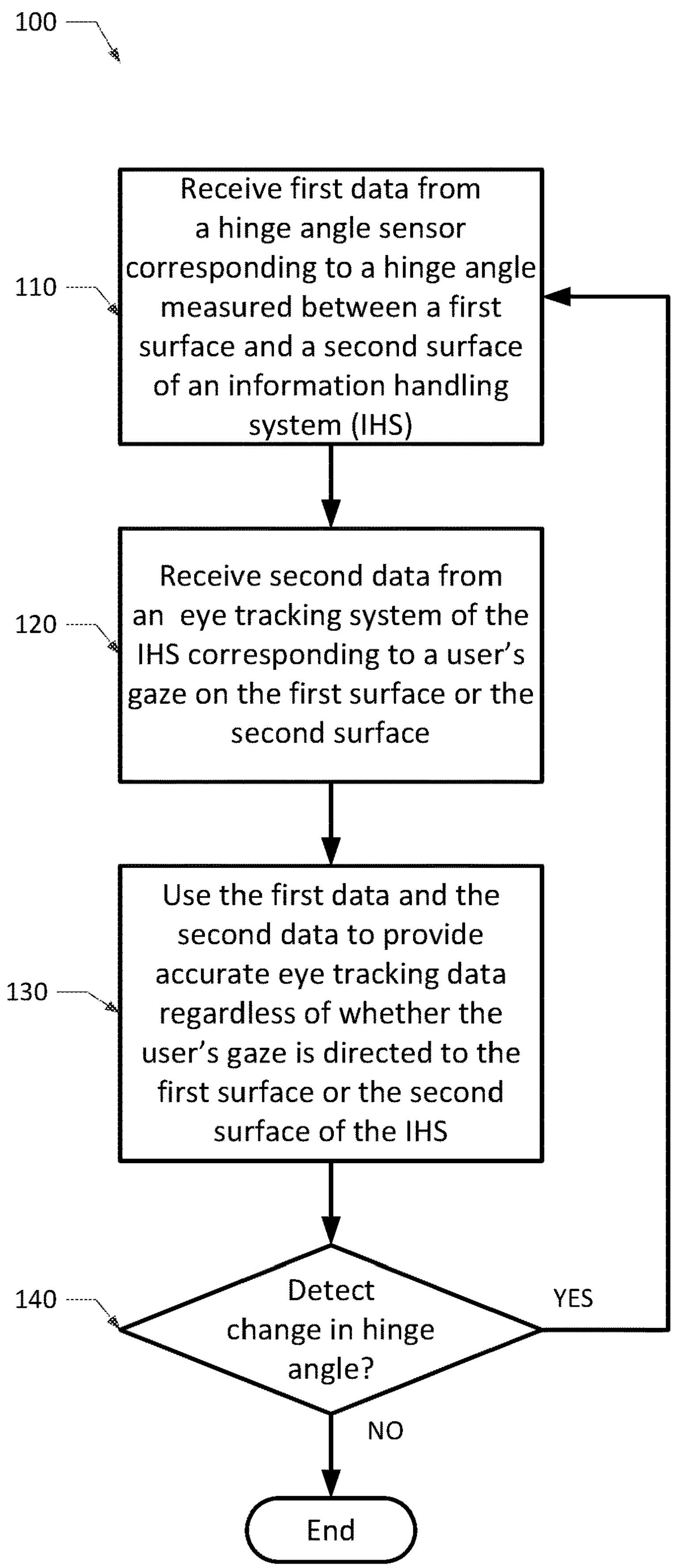
FIG. 4 is a flowchart diagram illustrating one embodiment of a method that may be used by an information handling system (IHS) to improve the accuracy of eye tracking data generated by an eye tracking system included within the IHS, wherein the eye tracking system is used to track a user's gaze on a first surface and a second surface of the IHS.

FIG. 4 is a flowchart diagram illustrating one embodiment of a method 100 that may be used by an information handling system (IHS) to improve the accuracy of the eye tracking data generated by an eye tracking system included within the IHS. In general, the method shown in FIG. 4 may be performed by at least one processing device of an IHS (e.g., processing device 60) executing program instructions, which may be stored for example within a computer readable storage medium or memory (e.g., computer readable storage medium or memory 70) of the IHS.

As such, the method shown in FIG. 4 and described herein represents a computer implemented method, which is performed by hardware, software and/or firmware components of an information handling system. The computer implemented method shown in FIG. 4 improves how an information handling system functions, in at one respect, by providing an accurate assessment of a user's gaze location even when the user's gaze is not directed to the gaze interaction plane (P) of the eye tracking system. Other improvements provided by the computer implemented method disclosed herein may be readily apparent to one skilled in the art.

FIG. 5 is a graphical depiction illustrating one embodiment of an information handling system, in which a single eye tracking system (denoted with an "s") is included within the IHS for tracking the location of a user's gaze on a plurality of display screens (e.g., "Display 1" and "Display 2"). In the embodiment illustrated in FIG. 5, the eye tracking system ("s") is mounted onto (or embedded within) a bottom peripheral portion of the first display screen ("Display 1") at origin point (0, 0, 0). When positioned in such a manner, the display screen surface of the first display screen lies within (or is parallel to) the gaze interaction plane (P) of the eye tracking system (e.g., the x-y plane in FIG. 5).

As noted above, the second display screen ("Display 2") may be rotationally coupled to the first display screen ("Display 1") via one or more hinges (not shown), which enable the display screen surfaces of the first and second display devices to rotate toward/away from one another about an axis (e.g., an x-axis) over a range of hinge angles (θ). The rotational movement provided by the hinge(s) enables the display screen surface of the second display device to be displaced from the gaze interaction plane (P) of the eye tracking system by the hinge angle (θ).

In the embodiment illustrated in FIG. 5, the display screen surface of the second display screen ("Display 2") lies within (or is parallel to) a projected gaze interaction plane (P') (e.g., the x-y' plane in FIG. 5). The projected gaze interaction plane (P') intersects the gaze interaction plane (P) of the eye tracking system at the x-axis (e.g., the rotational axis provided by the hinge(s)) and is displaced from the gaze interaction plane (P) by the hinge angle (θ).

As described in more detail below, the method 100 shown in FIG. 4 may be used by an information handling system component to provide accurate eye tracking data regardless of whether the user's gaze is directed to the first display device (i.e., the display device in which the eye tracking system is located), or directed to another display device (e.g., a second, third, fourth, etc. display device) or another IHS surface (e.g., a keyboard, touch pad or base of the IHS), which is rotationally coupled and adjacent to the first display device. As such, the method disclosed herein may be used to provide an accurate assessment of a user's gaze location even when the user's gaze is not directed to the gaze interaction plane (P) of the eye tracking system (e.g., not directed to the first display device).

According to one embodiment, method 100 may begin (in step 110) by receiving first data from a hinge angle sensor (e.g., hinge angle sensor 40) of an information handling system (IHS). The first data received from the hinge angle sensor (in step 110) corresponds to a hinge angle (θ), which can be measured between a first surface and a second surface of the IHS. In some embodiments, the first surface may correspond to a display screen surface of a first display device (e.g., first display device 20 of FIG. 3, or "Display 1" of FIG. 5), and the second surface may correspond to a display screen surface of a second display device (e.g., second display device 30 of FIG. 3, or "Display 2" of FIG. 5) of the IHS. In other embodiments (not shown), the first surface may correspond to a display screen surface of a display device (e.g., first display device 20 or "Display 1"), and the second surface may correspond to a keyboard, touch pad or base of the IHS.

In step 120, second data may be received from an eye tracking system (e.g., eye tracking system 50) of the IHS. Although the method shown in FIG. 4 is illustrated as receiving the second data after the first data is received, alternatively embodiments of the method may receive the second data prior to receiving the first data, or may receive the first and second data at substantially the same time. Regardless of when it is received, the second data may include a variety of eye tracking data, including but not limited to, a gaze point, i (x, y, z), a gaze direction (α), a gaze vector (G), and/or a 3-D location, e (x, y, z), of the user's eye.

In one embodiment, the second data received from the eye tracking system (in step 120) may include a gaze point, i (x, y, z), on the gaze interaction plane (P) of the eye tracking system and a 3-D location, e (x, y, z), of the user's eye. In another embodiment, the second data received from the eye tracking system (in step 120) may include a gaze point, i (x, y, z), on the gaze interaction plane (P) of the eye tracking system, and a gaze vector (G) including a gaze direction (α) and a distance measured between the gaze point, i (x, y, z), and the user's eye. In such embodiments, the gaze point and/or the gaze vector may be used to determine the 3-D location, e (x, y, z), of the user's eye.

In step 130, the first data and/or the second data may be used to provide accurate eye tracking data, regardless of whether the user's gaze is directed to the first surface or the second surface of the information handling system. In some embodiments, the second data (i.e., the eye tracking data received from the eye tracking system) may be used in step 130 to provide an accurate location of the user's gaze when the user's gaze is directed to the first surface of the information handling system. As shown in FIG. 5, for example, the second data may include the gaze point, i (x, y, z), or location of the user's gaze on the first surface ("Display 1") of the information handling system. Because the first surface lies within (or is parallel to) the gaze interaction plane (P) of the eye tracking system in the illustrated embodiment, the second data provides an accurate location of the user's gaze when the user's gaze is directed to the first surface of the information handling system.

Figure 6:
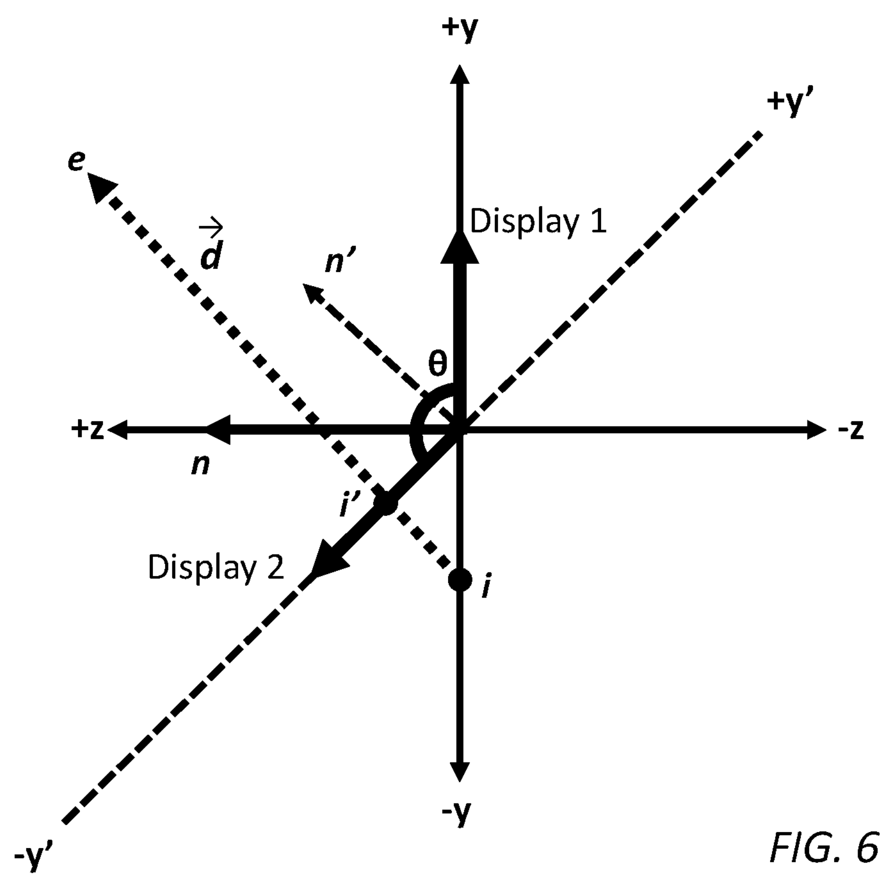
FIG. 6 is vector diagram illustrating how a hinge angle, θ, (e.g., first data) received from a hinge angle sensor may be used to project eye tracking data (e.g., second data) received from an eye tracking system onto a projected gaze interaction plane (P') when the user's gaze is directed to an IHS surface (e.g., "Display 2") that does not lie within a gaze interaction plane (P) of the eye tracking system.

In other embodiments, the first data (i.e., the hinge angle, θ, received from the hinge angle sensor) may be used to improve the accuracy of the second data (i.e., the eye tracking data received from the eye tracking system) in step 130 when the user's gaze is directed to the second surface of the information handling system (or another IHS surface that does not lie within the gaze interaction plane, P, of the eye tracking system). As shown in FIGS. 5 and 6, for example, the first data may be used in step 130 to transform the gaze interaction plane (P) of eye tracking system 50 into a projected gaze interaction plane (P') when the user's gaze is directed to the second surface of the information handling system. Once the projected gaze interaction plane (P') is determined, the second data received from the eye tracking system (e.g., the gaze point, i (x, y, z), located on gaze interaction plane, P) may be projected onto the projected gaze interaction plane (P') in step 130 to find the projected gaze point, i' (x, y, z), and thus, determine an accurate location of the user's gaze on the second surface of the information handling system.

EQS. 1-9 are provided below to illustrate one manner in which the first data and the second data may be used in step 130 of the method shown in FIG. 4 to determine an accurate location of the user's gaze when the user's gaze is directed to the second surface of the information handling system (or another IHS surface that does not lie within the gaze interaction plane, P, of the eye tracking system). Although the location of the user's gaze may be calculated using EQS. 1-9 below, other equations and/or algorithms may also be used.

In some cases, the method shown in FIG. 4 may detect a change in the hinge angle (θ) in step 140. For example, a change in the hinge angle (θ) may be detected in step 140 when the first surface is rotated further away/toward the second surface (or vice versa) to increase/decrease the hinge angle. If a change in the hinge angle (θ) is detected in step 140, the method steps 110-130 may be repeated to provide accurate eye tracking data at the new hinge angle. Otherwise, the method may end.

FIG. 6 is vector diagram illustrating how the first data (i.e., hinge angle, θ, received from the hinge angle sensor in step 110) may be used in step 130 to project the second data (i.e., the eye tracking data received from the eye tracking system in step 120) onto a projected gaze interaction plane (P') when the user's gaze is directed to an IHS surface (e.g., a second surface of the information handling system) that does not lie within the gaze interaction plane (P) of the eye tracking system. As shown in FIGS. 5 and 6, the first display device ("Display 1") lies within the x-y plane, which corresponds to the gaze interaction plane (P) of the eye tracking system (s). The second display device ("Display 2") lies within the x-y' plane, which corresponds to the projected gaze interaction plane (P'). The hinge angle (θ) is the angle between the gaze interaction plane (P) of the eye tracking system and the projected gaze interaction plane (P').

When a user's gaze is directed to the second display device ("Display 2"), the eye tracking system disclosed herein may provide a gaze point, i (x, y, z), and a 3-D location, e (x, y, z), of the user's eye to a processing device of the IHS as "second data" or eye tracking data. As shown in FIG. 6, the gaze point, i (x, y, z), provided by the eye tracking system is located on the gaze interaction plane (P) of the eye tracking system, and thus, is not an accurate assessment of the location of the user's gaze on the second display device when the second display device is rotated away from the gaze interaction plane, P (i.e., when hinge angle, θ, is any angle other than 180°).

In order to determine an accurate location of the user's gaze on the second display device, embodiments of the system and method disclosed herein define the gaze interaction plane (P) by a normal vector (n) extending outward (e.g., in the +z direction in FIG. 6) from the eye tracking system located at origin point (0, 0, 0). If the eye tracking system is not physically located at the origin point (0, 0, 0), an offset may be created to ensure that the origin point (0, 0, 0) corresponds to the physical location of the eye tracking system.

As noted above, the first data (i.e., the hinge angle, θ, received from the hinge angle sensor) may be used in step 130 of the method shown in FIG. 4 to transform the gaze interaction plane (P) of eye tracking system 50 into a projected gaze interaction plane (P') when the user's gaze is directed to the second surface of the information handling system. To determine the projected gaze interaction plane (P'), a normal vector (n) to the gaze interaction plane (P) of the eye tracking system may first be defined in matrix form as:

$$\vec{n} = \begin{bmatrix} 0 \\ 0 \\ 1 \end{bmatrix} \quad \text{EQ. 1}$$

Once the normal vector (n) is defined, a normal vector (n') to the projected gaze interaction plane (P') may be defined using clockwise rotation about the x-axis. In other words, the normal vector (n) of the gaze interaction plane (P) can be rotated in a clockwise direction about the x-axis by 180°−θ (i.e., the angle complementary to the hinge angle, θ) to define a normal vector (n') to the projected gaze interaction plane (P'). The normal vector (n') of the projected gaze interaction plane (P') may be defined in matrix form as:

$$\vec{n'} = \begin{bmatrix} 0 \\ \sin(\pi-\theta) \\ \cos(\pi-\theta) \end{bmatrix} = \begin{bmatrix} 0 \\ \sin(\theta) \\ -\cos(\theta) \end{bmatrix} \quad \text{EQ. 2}$$

where θ is the hinge angle and (π−θ) is the angle complementary to the hinge angle. From normal vector (n'), the projected gaze interaction plane (P') may be defined according to EQ. 3:

$$P'\colon y \sin\theta - z \cos\theta = 0 \quad \text{EQ. 3}$$

As noted above, the second data (i.e., the eye tracking data received from the eye tracking system) may be projected onto the projected gaze interaction plane (P') in step 130 of the method shown in FIG. 4 to determine an accurate location of the user's gaze when the user's gaze is directed to the second surface of the information handling system. In some embodiments, the second data received from the eye tracking system may include a gaze point, i (x, y, z), on gaze interaction plane (P) and a 3-D location, e (x, y, z), of the user's eye, which may be used to define a direction vector ($\vec{d}$). In some embodiments, the direction vector ($\vec{d}$) may be defined in parametric form according to EQ. 4:

$$\vec{d} = \begin{cases} x = e_x + (i_x - e_x)t \\ y = e_y + (i_y - e_y)t \\ z = e_z + e_z t \end{cases} \quad \text{EQ. 4}$$

where e (x, y, z) is the 3-D location of the user's eye, i (x, y, z) is the gaze point on the gaze interaction plane (P), and t is the slope of the direction vector ($\vec{d}$). In other embodiments, the second data received from the eye tracking system in step 120 may include a gaze vector (G), which may be used in place of the direction vector ($\vec{d}$).

Once the direction vector ($\vec{d}$) is defined, the y and z expressions from EQ. 4 can be inserted into EQ. 3 to solve for t, as shown in EQS. 5 and 6 below.

$$P': [e_y + (i_y - e_y)t]\sin\theta - [e_z + e_z t]\cos\theta = 0 \quad \text{EQ. 5}$$

$$t = \frac{e_z\cos\theta - e_y\sin\theta}{e_z\cos\theta - (e_y - i_y)\sin\theta} \quad \text{EQ. 6}$$

The slope (t) shown in EQ. 6 may then be inserted into the direction vector ($\vec{d}$) shown in EQ. 4 to find the projected gaze point, i' (x, y, z), on the projected gaze interaction plane (P'). In some embodiments, the projected gaze point, i' (x, y, z), may be defined according to EQS. 7-9:

$$i'_x: \frac{e_x i_x\cos\theta - (e_x i_y - e_y i_x)}{e_z\cos\theta - (e_y - i_y)\sin\theta} \quad \text{EQ. 7}$$

$$i'_y: \frac{e_z i_y\cos\theta}{e_z\cos\theta - (e_y - i_y)\sin\theta} \quad \text{EQ. 8}$$

$$i'_z: \frac{e_z(2e_z\cos\theta - (2e_y - i_y)\sin\theta)}{e_z\cos\theta - (e_y - i_y)\sin\theta} \quad \text{EQ. 9}$$

The first data (i.e., the hinge angle, θ) and the second data (i.e., gaze point, i (x, y, z), and 3-D location, e (x, y, z), of the user's eye) can then be inserted into EQS. 7-9 to determine the projected gaze point, i' (x, y, z), of the user's gaze on the projected gaze interaction plane (P'). In this manner, the first and second data may be used to determine an accurate location of the user's gaze when the user's gaze is directed to the second surface of the information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. An information handling system in accordance with the present disclosure may generally include one or more information handling resources. The information handling resources may include any component, system, device or apparatus of the information handling system, including without limitation processors, busses, computer-readable media, input-output devices and/or interfaces, storage resources, network interfaces, motherboards, electro-mechanical devices (e.g., fans), and/or power supplies.

It will be understood that one or more of the tasks, functions, or methodologies described herein may be implemented, for example, as firmware or as a computer program of instructions embodied in a non-transitory tangible computer readable medium that is executed by a CPU, controller, microcontroller, processor, microprocessor, FPGA, ASIC, or other suitable processing device. In one embodiment, for example, the method shown in FIG. 4 may be implemented as computer program instructions, which are stored within computer readable medium or memory 70 and executed by processing device 60 of information handling system 10.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method to improve the accuracy of eye tracking data generated by an eye tracking system coupled to a first surface of an information handling system (IHS), wherein the first surface of the IHS is coupled to a second surface of the IHS via a hinge that enables the first and second surfaces to rotate about an axis over a range of hinge angles, and wherein the method comprises:

receiving first data corresponding to a hinge angle measured between the first surface and the second surface of the IHS;

receiving second data corresponding to a user's gaze on the first surface or the second surface; and using the first data and the second data to provide accurate eye tracking data when the user's gaze is directed to the second surface of the IHS.

2. The method as recited in claim 1, wherein the first surface is parallel to a gaze interaction plane (P) of the eye tracking system, and wherein the second surface is displaced from the gaze interaction plane (P) by the hinge angle.

3. The method as recited in claim 1, further comprising using the second data, but not the first data, to provide accurate eye tracking data when the user's gaze is directed to the first surface of the IHS.

4. The method as recited in claim 3, further comprising: detecting a change in the hinge angle, such that a new hinge angle is measured between the first surface and the second surface; and wherein upon said detecting a change in the hinge angle, the method further comprises repeating the steps of receiving first data corresponding to the new hinge angle, receiving second data corresponding to a user's gaze on the first surface or the second surface, using the first data and the second data to provide accurate eye tracking data when the user's gaze is directed to the second surface, and using the second data, but not the first data, to provide accurate eye tracking data when the user's gaze is directed to the first surface.

5. The method as recited in claim 1, wherein said using the first data and the second data comprises:

using the first data to transform the gaze interaction plane (P) of eye tracking system into a projected gaze interaction plane (P'), which is displaced from the gaze interaction plane (P) by the hinge angle; and projecting the second data onto the projected gaze interaction plane (P') to determine an accurate location of the user's gaze on the second surface of the IHS.

6. The method as recited in claim 5, wherein said using the first data to transform the gaze interaction plane (P) comprises:

rotating a normal vector (n) of the gaze interaction plane (P) in a clockwise direction about the axis by an angle complementary to the hinge angle to define a normal vector (n') to the projected gaze interaction plane (P'); and using the normal vector (n') to define the projected gaze interaction plane (P').

7. The method as recited in claim 5, wherein the second data comprises a gaze point on the gaze interaction plane of the eye tracking system and a 3-D location of the user's eye.

8. The method as recited in claim 7, wherein said projecting the second data onto the projected gaze interaction plane (P') comprises:

defining a direction vector between the gaze point on the gaze interaction plane and the 3-D location of the user's eye; and using the direction vector to locate a projected gaze point on the projected gaze interaction plane (P').

9. An information handling system (IHS), comprising:

a first display device;

a second display device rotationally coupled to the first display screen via a hinge that enables the first and second display devices to rotate about an axis over a range of hinge angles;

a hinge angle sensor configured to generate data corresponding to a hinge angle measured between the first and second display devices;

an eye tracking system coupled to the first display device, and configured to generate eye tracking data corresponding to a user's gaze on the first and second display devices;

a computer readable storage memory configured to store program instructions; and a processing device coupled to receive the data generated by the hinge angle sensor and the eye tracking data generated by the eye tracking system;

wherein when the user's gaze is directed to the second display device, the processing device executes the stored program instructions to improve the accuracy of the eye tracking data received from the eye tracking system using the data received from the hinge angle sensor.

10. The information handling system recited in claim 9, wherein the eye tracking system is mounted onto, or embedded within, the first display device.

11. The information handling system recited in claim 9, wherein when the user's gaze is directed to the first display device, the processing device uses the eye tracking data received from the eye tracking system to provide an accurate location of the user's gaze.

12. The information handling system recited in claim 9, wherein the eye tracking data generated by the eye tracking system comprises a gaze point located on a gaze interaction plane (P) of the eye tracking system.

13. The information handling system recited in claim 12, wherein a display screen surface of the first display device is parallel to the gaze interaction plane (P) of the eye tracking system, and wherein a display screen surface of the second display device is displaced from the gaze interaction plane (P) by the hinge angle.

14. The information handling system recited in claim 12, wherein when the user's gaze is directed to the second display device, the processing device executes:

a first set of the stored program instructions to transform the gaze interaction plane (P) of eye tracking system into a projected gaze interaction plane (P'), which is rotationally displaced from the gaze interaction plane (P) by the hinge angle; and a second set of the stored program instructions to project the eye tracking data generated by the eye tracking system onto the projected gaze interaction plane (P') to determine an accurate location of the user's gaze on the second display device.

15. The information handling system recited in claim 14, wherein the processing device executes the first set of the stored program instructions to:

rotate a normal vector (n) of the gaze interaction plane (P) in a clockwise direction about the axis by an angle complementary to the hinge angle to define a normal vector (n') to the projected gaze interaction plane (P'); and use the normal vector (n') to define the projected gaze interaction plane (P').

16. The information handling system recited in claim 14, wherein the eye tracking data generated by the eye tracking system comprises the gaze point located on the gaze interaction plane (P) and a 3-D location of the user's eye.

17. The information handling system recited in claim 16, wherein the processing device executes the second set of the stored program instructions to:

define a direction vector between the gaze point on the gaze interaction plane and the 3-D location of the user's eye; and use the direction vector to locate a projected gaze point on the projected gaze interaction plane (P') corresponding to the location of the user's gaze on the second display device.

18. The information handling system recited in claim 14, wherein the processing device is configured to execute a third set of the stored program instructions to detect a change in the hinge angle.

19. The information handling system recited in claim 18, wherein upon detecting a change in the hinge angle, the processing device receives data from the hinge angle sensor corresponding to a new hinge angle measured between the first and second display devices and re-executes the first and second sets of program instructions to determine an accurate location of the user's gaze on the second display device using the new hinge angle.

* * * * *